(No Model.) 2 Sheets—Sheet 1.

L. WENCHEL.
MACHINE FOR ABRADING AND FITTING WORK.

No. 557,462. Patented Mar. 31, 1896.

WITNESSES:
Robt. L. McPherson Jr.
G. M. Copenhaver.

INVENTOR
Lawrence Wenchel
BY
Johnson & Johnson
ATTORNEYS (No Model.) 2 Sheets—Sheet 2.
L. WENCHEL.
MACHINE FOR ABRADING AND FITTING WORK.
No. 557,462. Patented Mar. 31, 1896.
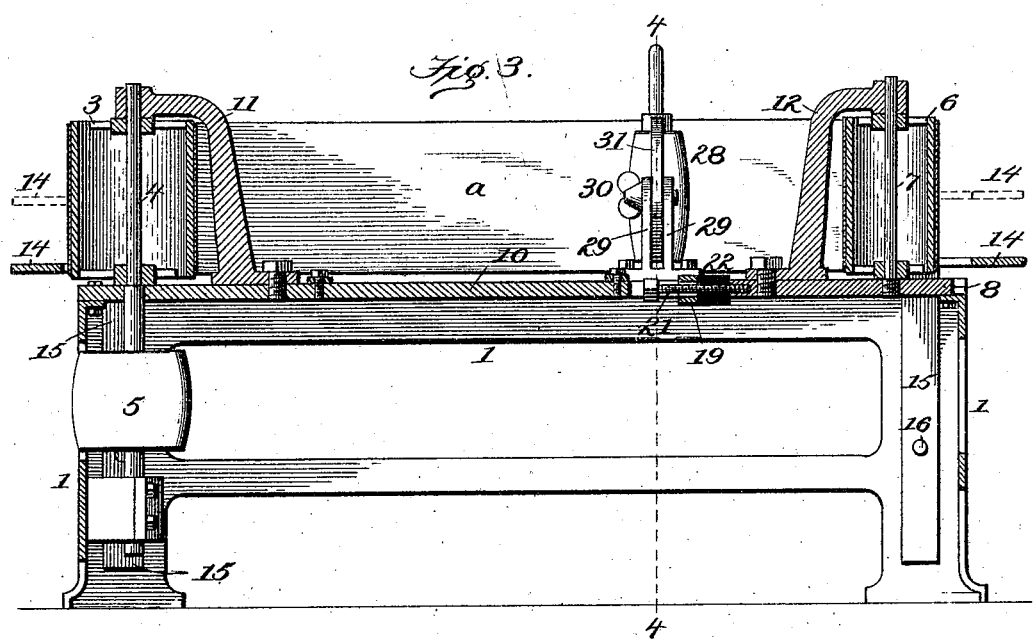
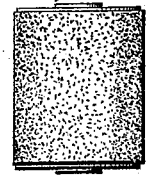
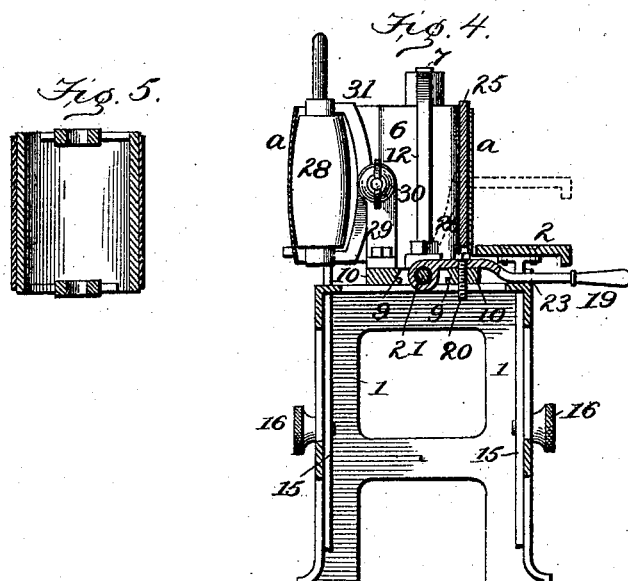
WITNESSES:
Robt. A. McPherson Jr.
Geo. M. Cofenbach
INVENTOR
Lawrence Wenchel
BY
Johnson & Johnson
ATTORNEYS

UNITED STATES PATENT OFFICE.

LAWRENCE WENCHEL, OF BALTIMORE, MARYLAND.

MACHINE FOR ABRADING AND FITTING WORK.

SPECIFICATION forming part of Letters Patent No. 557,462, dated March 31, 1896.

Application filed July 9, 1895. Serial No. 555,418. (No model.)

*To all whom it may concern:*

Be it known that I, LAWRENCE WENCHEL, of the city of Baltimore, in the State of Maryland, have invented certain new and useful Improvements in Machines for Abrading and Fitting Work, of which the following is a specification.

I have produced an improved machine for smoothing, dressing, and fitting plain or curved surfaces by means of an endless traveling band having an abrading-surface; and the objects of my improvements are to increase the working capacity of the abrading-band; to provide an adjustable table for the work coöperating with the endless abrading-band in a way to present the work to different parts of the abrading-surface and at different angles thereto; to provide for presenting and manipulating the work to an abrading-surface standing vertically in relation to a table supporting the work at the front side and at each end of the band; to provide for the use of an interchangeable carrying-roll for the abrading-band and for the employment therewith of different-size carrying-rolls to suit different work; to provide a face-plate for the working surface of the band adapted for adjustment to suit the adjustment of said band upon carrying-rolls of different size; to provide for maintaining the proper relation of the working band upon its carrying-rolls, and to adapt the machine for perfectly true work.

The improvement which is the subject of this patent consists of certain novel parts and combinations of parts, which are particularly pointed out and designated in the claims concluding this specification.

The accompanying drawings, which form part of this specification, represent my machine in the complete form in which I prefer to employ its several coacting parts; but it will be understood that my invention is not limited to the forms herein shown or to its use in the particular construction of its parts in their coacting relation.

Figure 1:
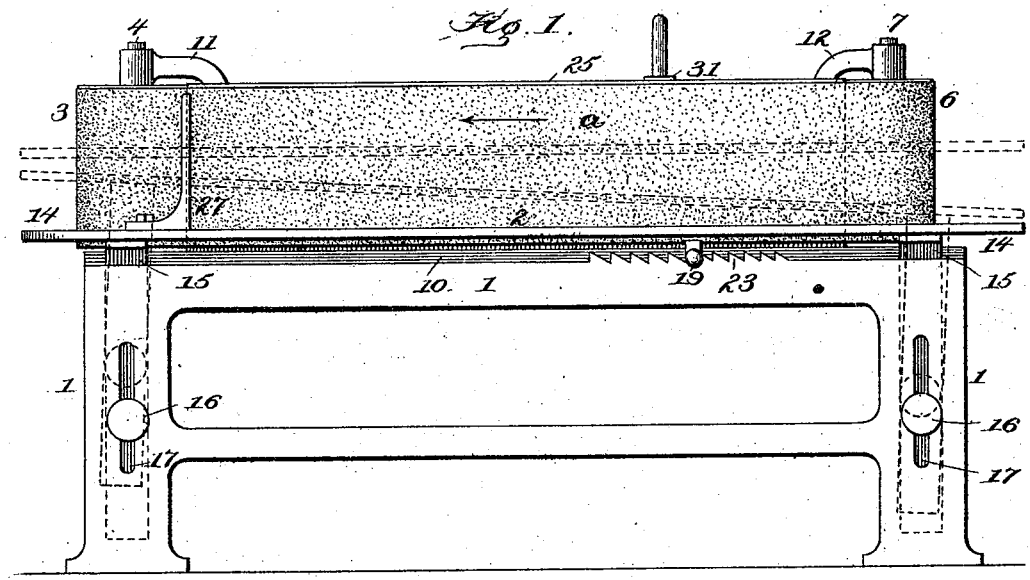
Figure 2:
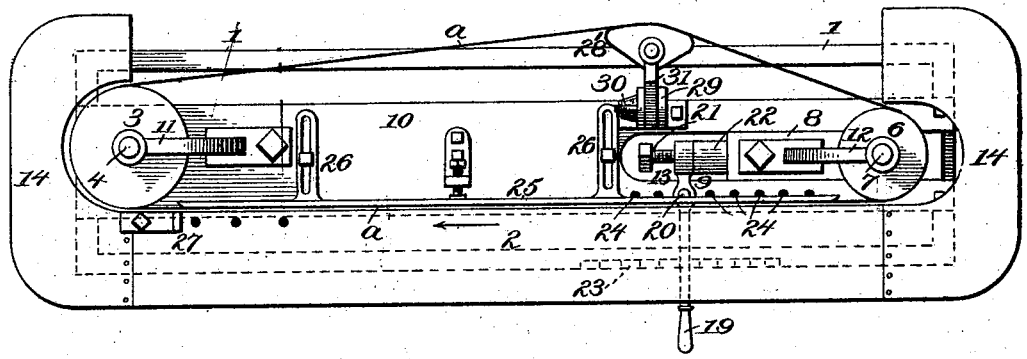

Referring to the drawings, Figure 1 shows in side view my abrading-machine. Fig. 2 is a top view of the same. Fig. 3 is a vertical longitudinal section of the same. Fig. 4 is a transverse section taken on the line 4 4 of Fig. 3, and Figs. 5 and 6 show the rolls with adhesive surface-covering for the abrading-band.

A frame 1 of suitable construction supports the working parts of the machine and a table 2 mounted for adjustment in relation to the endless traveling abrasive band $a$. At the opposite ends of this frame the driving and carrying rolls for the abrasive band are mounted so as to cause its working side to travel in vertical relation to the table. One of these rolls, 3, is the driver fixed upon its shaft 4, which is suitably mounted upon the frame and has the driven pulley 5. The other roll, 6, is mounted loosely upon a bearing-rod 7 fixed in a slide 8 fitted in suitable ways 9 9 in a top plate 10 of the frame. A bracket 11 fixed upon the top plate of the frame supports the upper end of the pulley-shaft 4, and a bracket 12 fixed on the slide 8 supports the upper end of the roll-bearing rod 7. The top plate 10 is bolted at each end to the frame. I prefer to form the ways 9 9 by an opening 13 in the top plate, which opening is of sufficient length to give the required longitudinal movement to the slide to suit the adjustment of the roll 6, for a purpose which I will presently state.

The table 2 need only extend along the front side of the machine and around at each end of the frame. The table ends 14 14 are cut out so as to receive the carrying-rolls of the abrasive band, and it will be understood that the front part of the table extends only to the front vertical wall of the abrasive band, so that the table can be raised and lowered along the working surface of the latter and over the rolls, for a purpose which I shall presently state. The table is mounted by legs 15, which are fitted preferably upon the inner walls of the frame-legs and secured thereto by clamp-screws 16, which pass through vertical slots 17 in the frame-legs and tapped into the table-legs to allow the table to be adjusted vertically either in a plane parallel to the edges of the abrasive band or obliquely thereto, as shown by dotted lines in Figs. 1 and 4. This adjustment is for the purpose of supporting the work against different portions of the abrading-surface, and particularly when the lower part of the surface becomes worn, or to support the work obliquely to the line of the travel of the abrading-surface in parallel lines and very considerably prolong the life of the abrading function of the band. The table can be adjusted at either end and thereby reverse the direction of the oblique position of the work to the line of travel of the band.

As stated, the table projects and forms a work-support, so that an operator can manipulate the work against the abrading-band at each roll for curved work, while a third workman can support work upon the table along the length of the band. For different sizes of curved work the roll 6 can be replaced by smaller rolls, and for this purpose I provide for adjusting the roll-bearing 7 farther away from the fixed roll-bearing 4 to accommodate the increased length of the band when smaller rolls are used in place of the roll 6. This adjustment I make by the provision of the slide 8, the setting of which is controlled by a lever 19 pivotally connected by a pin 20 to the top frame-plate 10, as shown in Figs. 2 and 4. This lever stands transversely beneath the table and is connected to a central stem 21 of said slide, such lever connection being cushioned on said stem by rubber 22, while the lever-handle is adapted to engage a ratchet-rack 23 on the frame to hold the lever and the roll-slide in position when the band is set to the required tautness. To give the lever the proper relation to the slide, a series of holes 24 is provided in the frame-plate 10 to permit the proper adjustment of the lever, according to the extent of the adjustment of the slide. The table end at the roll 6 is cut out to receive the roll and to allow it to be extended as may be required in substituting smaller rolls.

For supporting the working side of the abrading-band I provide a face-plate 25 of a length and width equal to the working surface of the band between its carrying-rolls. This plate is perfectly true and unyielding, stands against the inner side of the band, and is secured so that it can be adjusted to the line of the band. For such adjustment it has slotted knee-brackets 26 26 near each end, which receive bolts fastening them to the frame top plate.

In mounting the abrading-band upon a loose roll smaller than the one shown the working face of the band will stand oblique to a line drawn through the axes of the rolls and the face-plate must be set to conform to the oblique line of the band. The brackets stand across the top plate and give a firm hold for the face-plate. A rest 27 is adjustably secured to the table adjacent to the working face of the band, against which the work rests while under operation. This rest is movable with the table and is set at or near the end of the supporting-plate for the band, so that the article being operated on will be firmly supported at every part of its surface under action.

It will be noticed that the rolls are true cylinders, so that the band at these supporting-surfaces can be utilized for smoothing, fitting, and reducing curved work. To obtain this advantage of making work-surfaces of both rolls, (as a crown-roll cannot be used as a work-supporting surface,) I provide a governing device arranged between the rolls and adapted to hold the band in true relation to the rolls to prevent it from working up or down on the rolls, as the least irregularity in the band or in the mounting of the rolls or the pressure of the work against the band near its edge would cause it to do. This governing device I prefer to make in the form of a loosely-mounted crown-roll 28 of a length about equal to the width of the band and mount it in a true line transversely to the band upon a bracket 29 bolted to the frame top plate between the traveling sides of the band, so that the roll will maintain a bearing against the non-abrasive surface of that side of the band at the rear side of the machine. I prefer to mount the governing device in a yoke 31 having a pivotal connection 30 with the supporting-bracket 29 to give the device capacity for adjustment in transverse relation to the band, so as to counteract its tendency to work up or down, and when properly adjusted the yoke is clamped by its screw pivotal connection. For such adjustment the axis of the roll may be extended to form a handle. As stated, I prefer a rolling surface for such governor as causing the least friction upon the band; but it is obvious that a non-rolling surface 28', rigidly held in the bracket, will give the desired result if its bearing-surface has the contour, as shown in Fig. 2, to hold the band true upon its carrying-rolls—that is, a bearing-surface convex in a direction both crosswise and lengthwise of the band. A very slight adjustment of this governer device will be sufficient to counteract the tendency of the band to slide toward either end of the loosely-mounted roll. If such tendency be upward, the governor device is set a little outward at its top, and if the tendency of the band is to slip downward the governor device is set a little outward at its lower end, and for this purpose the yoke which carries the governor device is preferably mounted on a pivot located mediately of the length of the governor device and coincident with a middle line of the band, as seen in Fig. 4. It is rotated by the travel of the band when a roll is used. This combination of a governor for one side of the endless traveling band and an unyielding face-plate supporting the working side of the band gives a true working surface to the band, not only between the rolls, but upon them, so that at one side and at each end work of different kinds can be done at once, in which the operators can hold and manipulate the work freely as well as on the table.

It is important that the band face-plate should be perfectly smooth and true to give the least friction to the band and to keep its surface true at every part for perfect work in polishing and fitting faces, edges, and curves.

The provision of the table which permits its adjustment over the vertical working side and ends of the abrading-band not only gives the advantage of presenting the work while resting upon the table to different parts of the abrading-surface, but at different angles to the abrading-surface, and therefore renders its wear uniform and prolongs its capacity for use. In this adjustment the table can be raised at one end only, or at both ends uniformly, without disturbing its relation to the band. This advantage is obtained by mounting the abrading-band so that its working surface will stand vertical and the table partially surrounding it and independent of it.

The band-carrying rolls I prefer to make hollow and to construct as light as possible and with a surface-covering of canvas or other suitable material faced with rubber that will form an adhesive and slightly-yielding pulley-surface which will contribute materially to the durability and true working of the band on the rolls. This adhesive covering may be cemented or otherwise properly secured to the surface of the rolls, so as to give a perfectly smooth and even surface and the band a perfectly flat form and a true contact along and upon the face of the plate which supports it under the action of the work. The governing device may also be covered with the same material which would contribute to the proper holding and controlling of the band upon the rolls.

The band is prepared for different kinds of work and for wood and for metal working, and it can be interchanged to suit the work by the slackening of the band by the ratchet-lever, thus permitting the band to be taken off the rolls and replaced by a different or a new one.

The governing device, whether rotative or non-rotative, must have its contact-surface convex in the length of the band and convex in a direction transversely of the band, and its mounting must be such as to allow it to be set transversely of the band to control and to govern its relation to the carrying-rolls, the said setting being upon a pivot-center at one side of and mediately of the length of said governor device, so that its action will be essentially upon the middle of the width of the band to cause the governor to perform the function which I have stated.

I have described the face-plate of the endless abrasive band as being secured by bracket-supports near each end by which the plate can be adjusted to suit the changed position of the working side of the band when a smaller roll is substituted in place of the roll 6; but as the plate would be liable to spring or yield in the middle of its length under the pressure of the work I provide an adjustable bearing 32, formed by a screw in a stud 33, secured to the table-top. I make this bearing serve also as the means of giving the face-plate a slight convexity, so that the band will give a corresponding concave to the surfaces or edges of the work when such surfaces or edges are secured together and thus make a necessary tight glue joining. In this adjustment the face-plate will be held in fixed relation to the table-top by the bracket-supports, while by forcing the screw-bearing out against the back of the plate it will be very slightly bowed to give it a convex supporting-face for the band, but this adjustment is only made for glue-joined work to prevent such joining from opening at its ends, as is often the case in forcing perfectly straight edges together.

I claim as my improvement—

1. In an abrading-machine, the combination, with an endless traveling abrasive band and carrying-rolls, of a governing device having a surface convex in a direction both crosswise and lengthwise of said band and mounted mediately of its length upon an adjusting-pivot, whereby its adjustment will be from a point in line with the middle of the width of said band to govern its position on the carrying-rolls in the way described.

2. In an abrading-machine, the combination with an endless traveling abrasive band and carrying-rolls of true cylinders of a governing device consisting of a crown-roll mounted upon a pivot at its side and mediately of its length for contact with and adjustment in transverse relation to the said band, substantially as described.

3. In an abrading-machine, the combination, with an endless traveling abrasive band, and carrying-rolls of true cylinders, of a governing device having a convex surface, pivoted and adjustable in the arc of a circle the center of which is mediately of the length of such governing device and at one side of its convex surface, for the purpose stated.

4. In an abrading-machine, the combination, with an endless traveling band and carrying-rolls, of a governing device mounted for adjustment and contact with said band to keep it properly on said rolls and a face-plate arranged to support the working side of said band.

5. In an abrading-machine, the combination, with an endless traveling abrasive band, carrying-rolls therefor, an unyielding plate supporting the working side of said band, and means for giving said plate a fixed adjustment at one or both ends to conform to the angle of the band for a different size of carrying-roll, and a work-table partially surrounding said band, whereby to support work at three sides of said band.

6. In an abrading-machine, the combination, with an endless traveling abrasive band and carrying-rolls therefor, of a face-plate for supporting the working side of said band, having adjustable bracket-supports at or near each end, and an adjustable bearing arranged to support the middle of said face-plate for the purpose stated.

7. The combination, with an endless traveling abrasive band, and carrying-rolls therefor one of which is interchangeable for different sizes, and an unyielding plate for the working side of said band, having brackets adjustably secured between said rolls, and means for adjusting one of said rolls, for the purpose stated.

8. In an abrading-machine, an endless traveling abrasive band, carrying-rolls of true cylinders mounted vertically, a governing device having a crown-surface for engaging and maintaining the proper relation of band and rolls, an unyielding face-plate arranged to support the working side of said band and a table arranged to support the work at the side and at the ends of said band, substantially as described.

9. In an abrading-machine, the combination, with an endless traveling abrasive band mounted upon vertical carrying-rolls, a frame supporting said rolls, and an unyielding face-plate for supporting the working side of said band secured to said frame, of a table mounted upon said frame around one side and both ends of the band, whereby to support work at the straight side and at both ends of the band.

10. The combination with an endless traveling abrasive band, carrying-rolls therefor, and an unyielding face-plate arranged to support the working side of the band, of a band-governing device having a crown-roll surface and pivotally mounted at a point mediately of its length, whereby its adjustment in relation to the band is made upon an arc the center of which is in line with the middle of the width of said band, for the purpose stated.

11. In an abrading-machine, the combination, with a frame having a horizontal slide at one end, a roll vertically mounted thereon, a roll vertically mounted at the other end of said frame, and an endless abrasive band upon said rolls, of an adjustable face-plate mounted on said frame for supporting the working side of said abrasive band, a lever pivoted upon said frame and engaging said slide, a rack on said frame for engaging said lever, and a table for supporting the work substantially as described.

12. In an abrading-machine, the combination, with the rolls, an endless abrasive band thereon, an adjustable face-plate for supporting the working side of said band, an adjustable support for one of the rolls, an adjustable governing device for said band, and an adjustable table substantially as described.

13. In an abrading-machine, the combination, with an endless abrasive band, carrying-rolls therefor, an adjustable face-plate for the working side of said band, an adjustable support for the middle of said face-plate and an adjustable table, substantially as described.

14. In combination, in an abrading-machine, a frame, an endless abrasive band, carrying-rolls therefor having an adhesive facing, an adjustable supporting face-plate and an adjustable governing device for said band, an adjustable support for one of the band-rolls, and an adjustable table fitted to be raised and lowered over the vertical sides of said band, substantially as described.

15. The combination with an endless traveling abrasive band, carrying-rolls therefor, and an unyielding face-plate arranged to support the working side of said band, with a crown-roll governor, a bearing-bracket therefor, a fixed bracket and a clamp-screw pivotally connecting the said brackets at the middle of the length of the roll-bracket and in position mediately of the bearings of said roll, for the purpose stated.

In testimony whereof I have hereunto signed this specification in the presence of witnesses.

LAWRENCE WENCHEL.

Witnesses:
A. E. H. JOHNSON,
A. ROLAND JOHNSON.